United States Patent [19]

Yamazaki et al.

[11] Patent Number: 4,511,761
[45] Date of Patent: Apr. 16, 1985

[54] AUTOMATIC COMMUNICATION STANDBY DEVICE IN CORDLESS TELEPHONE

[75] Inventors: Kenji Yamazaki, Chiba; Kazuo Maeda, Tokyo, both of Japan

[73] Assignee: Uniden Corporation of Japan, Ichikawa, Japan

[21] Appl. No.: 389,501

[22] Filed: Jun. 17, 1982

[30] Foreign Application Priority Data

Apr. 9, 1982 [JP] Japan .................................. 57-58198

[51] Int. Cl.³ .......................... H04M 1/02; H04B 1/40
[52] U.S. Cl. ................................ 179/2 EA; 179/2 BC; 455/73; 455/89; 455/127
[58] Field of Search ........................ 455/73, 78, 79, 89, 455/90, 127; 179/2 EA, 2 BC, 2 C, 2 E

[56] References Cited

U.S. PATENT DOCUMENTS 3,919,491  9/1973  Luce ................................. 179/2 EA

*Primary Examiner*—Marc E. Bookbinder
*Attorney, Agent, or Firm*—Schwartz & Weinrieb

[57] ABSTRACT

A switching element is inserted in a power supply line to a transmission circuit in the portable unit of a cordless telephone. The charge potential which is supplied from the base unit to the portable unit actuates the switching element to break the power supply line when the portable unit is replaced on the cradle of the base unit.

20 Claims, 3 Drawing Figures

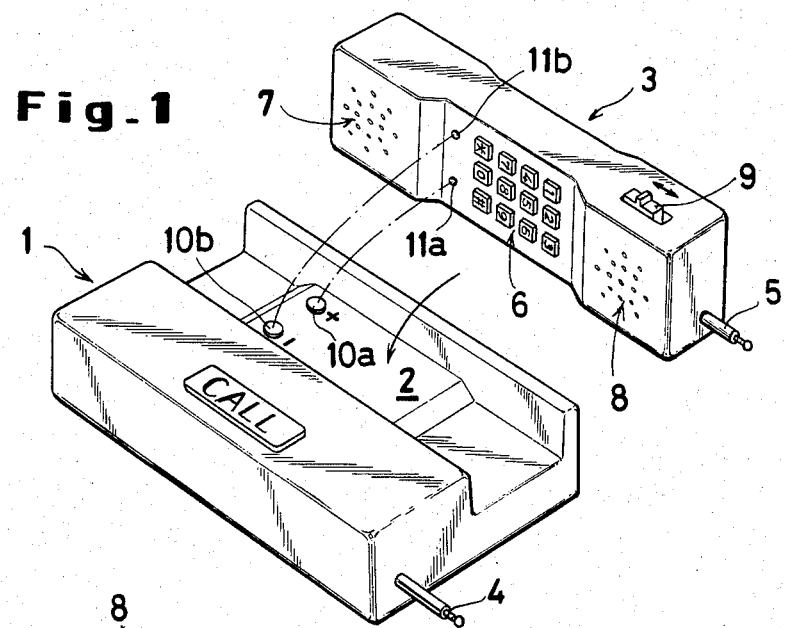
Fig_1
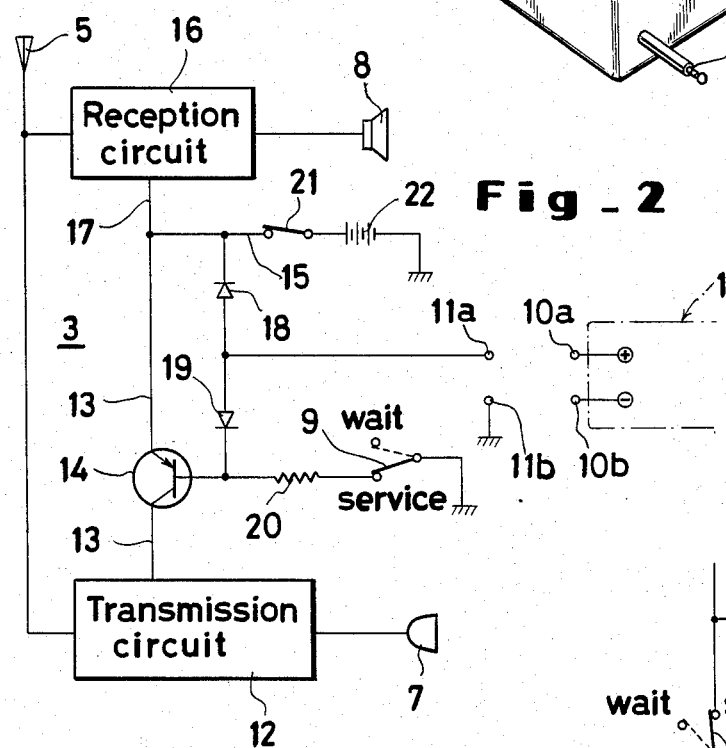
Fig_2
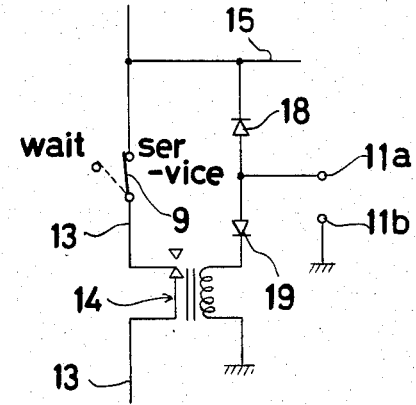
Fig_3

AUTOMATIC COMMUNICATION STANDBY DEVICE IN CORDLESS TELEPHONE

FIELD OF THE INVENTION

This invention relates to an automatic communication standby device in a cordless telephone.

BACKGROUND OF THE INVENTION

Generally in an ordinary telephone, when the user who has finished a call replaces the receiver on the cradle of the telephone, a hook switch is automatically actuated by the weight of the receiver and the telephone is consequently set in a standby state waiting for the next incoming or outgoing call.

In the case of a cordless telephone, namely a telephone relying upon radio communication connection between the main unit or base unit (hereinafter referred to as "base unit") of the telephone and a handset or portable unit corresponding to the receiver portion (hereinafter referred to as "portable unit") of the telephone, which has begun to find popular acceptance particularly in the United States, since the functions for reception, transmission, and dialing are incorporated on the portable unit side and in order that the telephone may resume the standby state without requiring the portable unit to be placed on the cradle of the base unit at the termination of each call, a "service"—"wait" changeover switch which is equivalent to the hook switch of the ordinary telephone is provided on the portable unit side so as to be manually operated.

Because of the construction described above, with the cordless telephone there is a possibility that even if the user adheres to the practice of replacing the portable unit on the cradle of the base unit at the end of each call, he will at times forget to turn the "service"—"wait" changeover switch to the "wait" side. If this happens, the service circuit will remain in its connected state and, particularly, the transmission circuit will continue not merely to operate uselessly but also to transmit unnecessary electric waves possibly to affect adversely other communication paths.

To avoid this situation, there has been proposed a device which, similar to the concept of the hook switch in the ordinary telephone, utilizes the impact of replacement of the portable unit on the cradle of the base unit to operate the changeover switch by means of a mechanical actuator and set the telephone to the standby state. By this measure, however, the size and appearance of the base unit and the portable unit and the layout of their component parts must be designed all over again specifically to permit incorporation of the additional function. No minor modification to the conventional cordless telephone suffices for the desired incorporation of this additional function. Thus, the proposed device lacks adaptability. Further, it inevitably entails an increase in a loss of the number of mechanical parts and, therefore, reliability.

OBJECT OF THE INVENTION

One object of this invention is to provide an automatic communication standby device in a cordless telephone, which is produced by giving a minor alteration to the circuit system of the existing cordless telephone without any change in the housing of the base unit and that of the portable unit or any addition of new mechanical parts to the two units and which enables the cordless telephone to assume a standby state upon contact made between the portable unit and the base unit when the former is replaced on the cradle of the latter.

SUMMARY OF THE INVENTION

The present invention, originating in the idea of utilizing the charging mechanism for the battery constantly kept in the portable unit of the cordless telephone, has a switching element inserted in the power supply line leading to the transmission circuit within the portable unit so that, whenever it is detected that a charge potential is being applied to the portable unit after the portable unit has been replaced on the cradle of the base machine, the aforementioned switching element is actuated to break the power supply line to the transmission circuit.

In accordance with the present invention, since the charge potential is utilized as a detection current, the changeover switch, if kept at the "service" position, is actuated without fail to break the power supply line whenever this charge potential to the portable unit is detected. Since this invention is accomplished by giving a slight alteration to the circuit system without any change in appearance, it can be easily applied to the existing cordless telephone.

BRIEF DESCRIPTION OF THE DRAWINGS

The other objects and characteristics of the present invention will become apparent from the further disclosure of invention to be made hereinbelow with reference to the accompanying drawing, wherein:

FIG. 1 is a perspective view illustrating one embodiment of a cordless telephone.

FIG. 2 is a schematic structural diagram illustrating one embodiment of the automatic communication standby device in the cordless telephone according to the present invention.

FIG. 3 is a schematic structural diagram illustrating an essential part of another embodiment of the automatic communication standby device in the cordless telephone according to the present invention.

DESCRIPTION OF PREFERRED EMBODIMENT

FIG. 1 represents the appearance of a typical cordless telephone. A base unit 1 is connected to an ordinary telephone circuit (not shown) and is plugged into a commercial power supply. The housing of this base unit has a cradle 2 for carrying a portable unit 3. The base unit 1 and the portable unit 3 communicate with each other via radio waves through the medium of antennae 4, 5. The portable unit 3 is provided with a dial part 6, a transmitter part 7, and a receiver part 8. It is further provided with a manually operable "service"—"wait" changeover switch 9 which is equivalent to the hook switch in the ordinary telephone as already described.

As the power source for driving the transmitter and receiver system contained in the portable unit, a rechargeable battery such as a Ni-Cd cell is built in the portable unit so that this battery is charged when the charge input terminals 11a, 11b exposed on the portable unit side come into contact with the charge output terminals 10a, 10b extended from the internal power source and exposed on the base unit when the portable unit 3 is replaced on the cradle 2 of the base unit 1.

The outer shapes of the base unit and the portable unit, the layout of the charging terminals, the manner of contact between these charging terminals, and the like, vary from one model of telephone to another. All the cordless telephones nevertheless share the basic configuration described above.

This invention, by giving a slight alteration to the internal circuit without requiring any change in the basic configuration or any mechanical or physical modification to the housings as by additional incorporation of a hook switch, makes it possible for the power supply line to the transmission circuit in the portable unit to be automatically broken whenever the portable unit is replaced on the cradle of the base unit.

FIG. 2 schematically represents the construction of one embodiment of the device according to the present invention. The idea of the present invention resides in the principle that the power supply line 13 leading to the transmission circuit 12 within the portable unit is broken by the detection of charge potential with respect to the charge input terminals 11a, 11b which come into contact with the charge output terminals 10a, 10b exposed as described above on the base unit 1 when the portable unit is replaced on the cradle of the base unit. In the present embodiment, a pnp-type transistor is used as the switching element 14 in the power supply line 13.

Now, the operation of the device of this invention will be described, starting from the ordinary manual operation of the "service"—"wait" changeover switch 9.

The power supply line 15 from the battery 22 such as a Ni-Cd cell which serves as the internal power supply in the portable unit 3 is forked into a power supply line 17 leading to the reception circuit 16 and a power supply line 13 leading to the transmission circuit 12. Between the charge terminal 11a and the power supply line 15, there is interposed a diode 18 in the normal direction as seen from the charge inlet terminal side.

A switching diode 19 is similarly connected in the normal direction as seen from the charge input terminal 11a. The cathode of this diode is connected to the base of a pnp-type transistor 14 which is inserted between the emitter and the collector in the power supply line 13 for the transmission circuit. This base is grounded via a resistor 20 and the switch 9.

A power supply switch 21 is inserted in a main power supply line 15. This switch is normally kept CLOSED. It is opened only when the device is put out of service for a long time. The reception circuit 16 remains in operation so long as this switch 21 is kept CLOSED. Power supply from the battery 22 is continued through the main power supply line 15 and the power supply line 17 for the reception circuit while the portable unit is kept off the cradle of the base unit. Power supply is made through the diode 18, the main power supply line 15, and the power supply line 17 for the reception circuit while the portable unit 3 rests on the cradle 2 (FIG. 1) and power is supplied from the charge output terminals 10a, 10b on the base unit 1 to the charge inlet terminals 11a, 11b.

When the user picks up the portable unit and manually sets the "service"—"wait" changeover switch 9 to the "service" position as indicated by the continuous line in FIG. 2, the pnp-type transistor 14 is closed by receiving base current and the power supply line 13 for the transmission circuit is connected, with the result that the power from the battery 22 is fed to the transmission circuit 12 and the circuit is connected. Thus, the user is ready to start talking with the other party.

When the user, on completing the call, remembers to set the changeover switch 9 and set it to the "wait (STBY)" position as indicated by the imaginary line in FIG. 2, the base of the transistor 14 is intercepted and the transistor is consequently opened, with the power supply to the transmission circuit 12 cut off.

Now, the operation of the device of this invention which occurs when the user forgets to set the switch 9 to the "wait" position at the end of the call will be described.

When the user replaces the portable unit on the cradle of the base unit with the switch 9 in the "service" position, the charge input terminals 11a, 11b on the daughter unit side receive power supply from the charge output terminals 10a, 10b on the base machine side. Consequently, this electric current flows through the diode 19 to ground. From the standpoint of potential, the emitter side potential of the transistor 14 and the base side potential are substantially equalized through the medium of the diode 18. Consequently, the base current fails to flow and the connection of the power supply line 13 to the transmission circuit 12 is automatically cut off. In this manner, the object of the device of this invention is fulfilled.

In the present embodiment, the reception circuit 16 is kept in operation constantly. When this circuit is adapted so that the portion thereof except the portion used for sounding a bell to indicate an incoming call may receive power from the outside side of the line 13 or may enjoy exclusive use of a switching element, the waste of power in that portion of the circuit may be prevented.

The switching element is not necessarily limited to the pnp-type bipolar transistor illustrated in FIG. 2. An npn-type transistor may be used when the circuit has a reversed polarity. Even a field effect transistor or some other suitable switching element such as a thyristor may be used instead. The function of the device remains equally the same when the switch 9 is inserted as serially connected with the transistor 14 and the terminal of the resistor on the base side is grounded.

FIG. 3 represents another embodiment of the device according to the present invention. In this embodiment, the "service"—"wait" changeover switch 9 is disposed as serially connected with the switching element 14 in the line 13. As the switching element 14, there is used a normally closed relay which operates with feeble electric power. In the device constructed as described above, even when the user on completing a call replaces the portable unit on the cradle 2 of the base unit with the switch 9 inadvertently left in the "service" position, the potential detection current flows through the diode 19 to actuate the relay 14 and break its contact and cut off power supply to the transmission circuit 12 when the charge potential appears at the terminals 11a, 11b.

As described above, in the cordless telephone, the present invention effects suspension of at least the transmission circuit from operation owing to the contact of the portable unit or handset with the cradle of the base unit without requiring any mechanical or physical alteration to the housings of the units. Thus, waste of electric power or emission of unwanted electric waves due to erroneous use of the telephone or failure to set the changeover switch can be prevented without fail. Further, the invention enjoys a major advantage in that it can be accomplished by giving a slight alteration to the circuit system in the existing cordless telephone.

Obviously, many modifications and variations of the present invention are possible in light of the above teachings. It is therefore to be understood that within the scope of the appended claims, the present invention may be practiced otherwise than as specifically described herein.

What is claimed is:

1. In a cordless telephone system comprising a base unit, and a portable unit having a transmission circuit and a reception circuit incorporated therein, said base and portable units being in communication with each other via radio waves, said base unit being provided with electric charge output terminals and said portable unit being provided with electric charge input terminals, and said charge output terminals and said charge input terminals being so adapted that when said portable unit is disposed upon a cradle of said base unit, said output and input terminals are brought into contact so as to charge a battery disposed inside said portable unit, the improvement comprising:

a switch disposed upon said portable unit and manually operable between a first service position and a second non-service position independently of the cradling or uncradling of said portable unit upon or from said base unit; and a switching element disposed within a power supply line extending from said battery to said transmission circuit of said portable unit and electrically coupled to said manually operated switch and said charge input terminals of said portable unit such that regardless of the disposition of said manually operated switch within either one of said first or second service or non-service positions, respectively, said switching element will assume an OPEN state, when charge potential is applied through said charge output terminals of said base unit to said charge input terminals of said portable unit as a result of said portable unit being disposed upon said cradle of said base unit so as to charge said battery of said portable unit, whereby said transmission circuit of said portable unit is rendered inoperative.

2. A cordless telephone according to claim 1, wherein said switching element is a pnp-type bipolar transistor.

3. A cordless telephone according to claim 1, wherein said switching element is a normally closed relay.

4. In a cordless telephone system including a base unit, and a portable unit having a transmission circuit and a reception circuit incorporated therein, said base and portable units being in communication with each other via radio waves, said base unit being provided with electric charge output terminals and said portable unit being provided with electric charge input terminals, and said charge output and input terminals being so adapted that when said portable unit is disposed upon a cradle of said base unit, said output and input terminals are brought into contact so as to charge a battery disposed inside said portable unit, the improvement comprising:

a switch disposed upon said portable unit and manually operable between a first service position and a second non-service position independently of the cradling or uncradling of said portable unit upon or from said base unit; and an electrically actuated switching element disposed within a power supply line extending from said battery to said transmission circuit of said portable unit and electrically coupled to said manually operated switch and said charge input terminals of said portable unit such that when said manually operated switch is disposed within said first service position, said switching element will assume an OPEN state in response to the existence of charge potential upon said electric charge input terminals of said portable unit as a result of the mating of said terminals of said portable and base units when said portable unit is disposed upon said cradle of said base unit so as to charge said battery of said portable unit, whereby said transmission circuit of said portable unit is rendered inoperative.

5. The cordless telephone as set forth in claim 4, wherein:
  said switching element is a pnp-type bipolar transistor.

6. A cordless telephone as set forth in claim 4, wherein:
  said switching element is a normally closed relay.

7. In a cordless telephone system including a base unit, and a portable unit having a transmission circuit and a reception circuit incorporated therein, said base and portable units being in communication with each other via radio waves, said base unit being provided with electric charge output terminals and said portable unit being provided with electric charge input terminals, and said charge output and input terminals being so adapted that when said portable unit is disposed upon a cradle of said base unit, said output and input terminals are brought into contact with each other so as to charge a battery disposed inside said portable unit, the improvement comprising:

a switch disposed upon said portable unit and manually operable between a first service position and a second non-service position independently of the cradling or uncradling of said portable unit upon or from said base unit;

an electrically controlled switching element disposed within a power supply line extending from said battery to said transmission circuit of said portable unit; and means electrically coupling said switching element to said manually operated switch and said charge input terminals of said portable unit for causing said switching element to assume an OPEN state regardless of the disposition of said manually operated switch within either one of said first or second service or non-service positions, respectively, when charge potential is applied through said charge output terminals of said base unit to said charge input terminals of said portable unit in response to the mating of said output and input terminals of said portable and base units when said portable unit is disposed upon said cradle of said base unit so as to charge said battery of said portable unit, whereby said transmission circuit of said portable unit is rendered inoperative.

8. A cordless telephone as set forth in claim 7, wherein:
  said switching element is a pnp-type bipolar transistor.

9. A cordless telephone as set forth in claim 7, wherein:
  said switching element is a normally closed relay.

10. A cordless telephone system as set forth in claim 4, further comprising:
  means electrically coupling said switching element to said manually operated switch and said charge input terminals of said portable unit for causing said switching element to assume an OPEN state in response to the existence of charge potential upon said terminals of said portable unit as a result of the mating of said terminals of said portable and base units when said portable unit is disposed upon said cradle of said base unit and when said manually operated switch is disposed within said second non-service position.

11. A cordless telephone system as set forth in claim 10, wherein:
said switching element is a normally closed relay.

12. A cordless telephone system as set forth in claim 2, wherein:
said transistor comprises an emitter, a base, and a collector.

13. A cordless telephone system as set forth in claim 12, wherein:
said transmission circuit of said portable unit is electrically connected between ground and said collector of said transistor.

14. A cordless telephone system as set forth in claim 12, wherein:
said manually operable switch is disposed within the base circuit of said transistor.

15. A cordless telephone system as set forth in claim 12, wherein:
said emitter of said transistor is coupled to a positive terminal of said battery of said portable unit.

16. A cordless telephone system as set forth in claim 1, wherein:
said manually operable switch is disposed in series with said switching element within said power supply line.

17. A cordless telephone system as set forth in claim 1, further comprising:
a pair of oppositely directed diodes electrically coupled to said charge input terminals of said portable unit between said switching element and said power supply line.

18. A cordless telephone system as set forth in claim 17, wherein:
the anodes of said diodes are electrically connected to a positive charge input terminal of said portable unit.

19. A cordless telephone system as set forth in claim 17, wherein:
a first one of said pair of diodes has its cathode electrically connected to said power supply line.

20. A cordless telephone system as set forth in claim 17, wherein:
a second one of said pair of diodes has its cathode electrically connected to said switching element.

* * * * *

REEXAMINATION CERTIFICATE (3824th)

United States Patent [19]
Yamazaki et al.

[11] B1 4,511,761

[45] Certificate Issued Aug. 3, 1999

[54] AUTOMATIC COMMUNICATION STANDBY DEVICE IN CORDLESS TELEPHONE

[75] Inventors: Kenji Yamazaki, Chiba; Kazuo Maeda, Tokyo, both of Japan

[73] Assignee: Uniden Corporation, Ichikawa, Japan

Reexamination Request:
No. 90/004,964, Apr. 13, 1998

Reexamination Certificate for:
Patent No.: 4,511,761
Issued: Apr. 16, 1985
Appl. No.: 06/389,501
Filed: Jun. 17, 1982

[30] Foreign Application Priority Data

Apr. 9, 1982 [JP] Japan ................................ 57-58198

[51] Int. Cl.$^6$ ................................................. H04Q 7/20
[52] U.S. Cl. ............................ 455/462; 455/73; 455/127; 455/573; 379/413

[58] Field of Search ........................... 455/73, 78, 79, 455/90, 127, 403, 426, 462, 465, 550, 561, 572, 573, 575; 379/387, 413; 320/108, 113, 114, 115, 165

[56] References Cited

U.S. PATENT DOCUMENTS 4,458,111  7/1984  Sugihara ........................... 179/2 BC

*Primary Examiner*—Dwayne D. Bost

[57] ABSTRACT

A switching element is inserted in a power supply line to a transmission circuit in the portable unit of a cordless telephone. The charge potential which is supplied from the base unit to the portable unit actuates the switching element to break the power supply line when the portable unit is replaced on the cradle of the base unit.

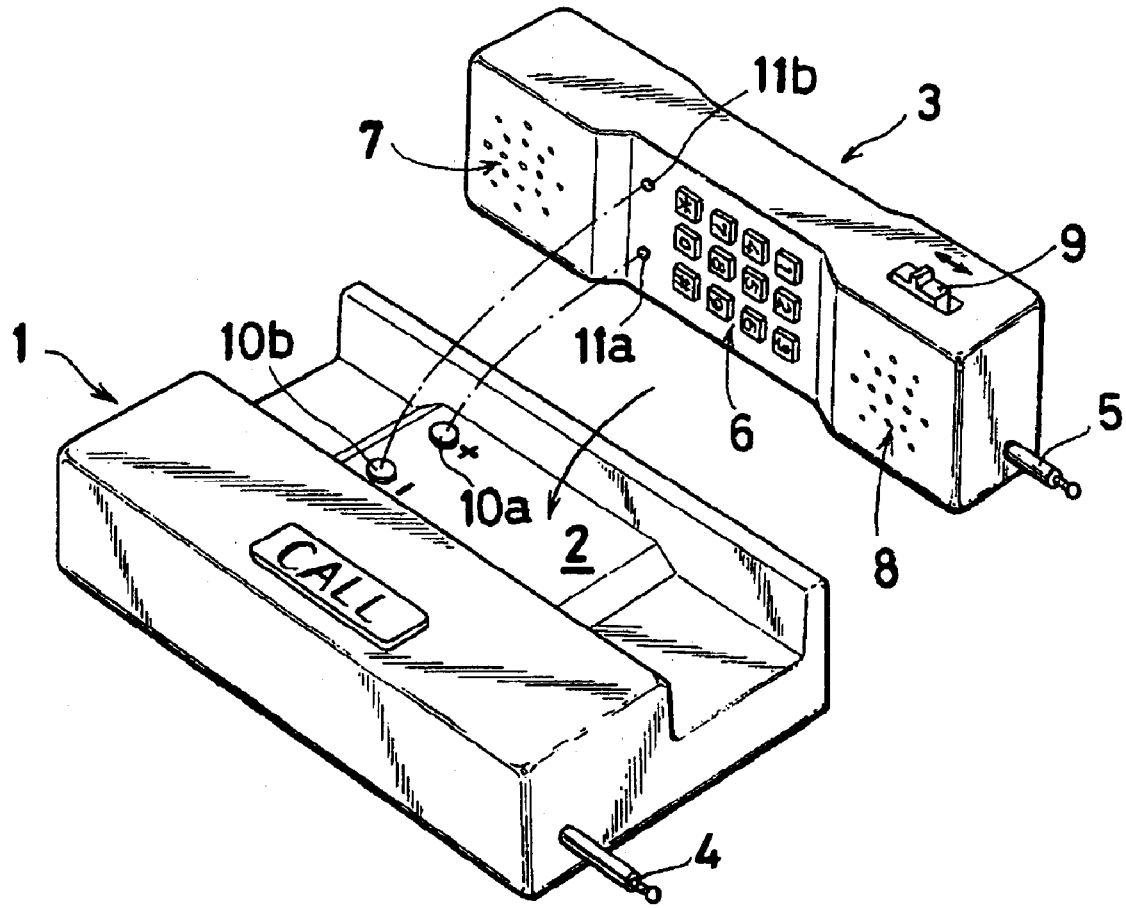

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *